No. 864,353. PATENTED AUG. 27, 1907.
L. ALLENBRAND.
WAGON BRAKE LOCK.
APPLICATION FILED FEB. 13, 1907.
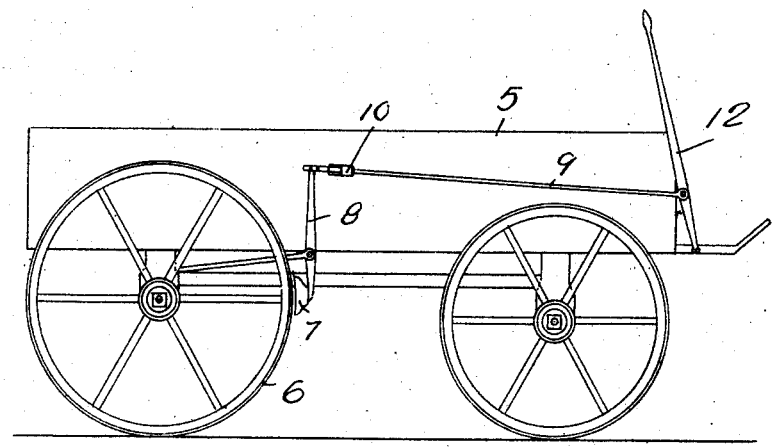
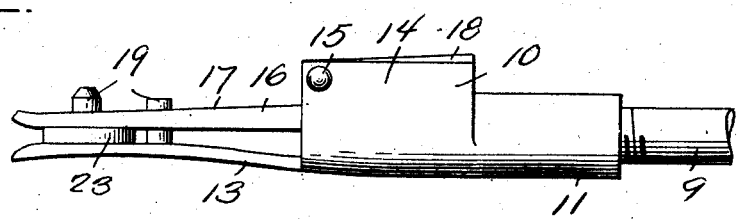
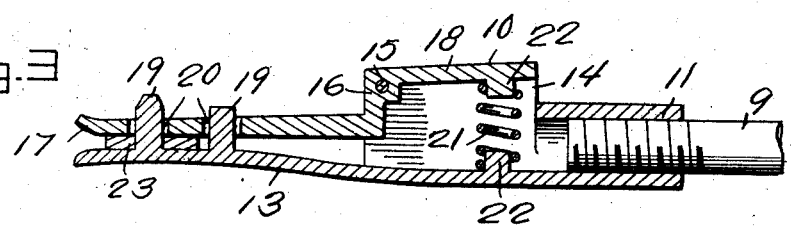

UNITED STATES PATENT OFFICE.

LAWRENCE ALLENBRAND, OF BASEHOR, KANSAS.

WAGON BRAKE-LOCK.

No. 864,353.  Specification of Letters Patent.  Patented Aug. 27, 1907.

Application filed February 13, 1907. Serial No. 357,177.

*To all whom it may concern:*

Be it known that I, LAWRENCE ALLENBRAND, a citizen of the United States, residing at Basehor, in the county of Leavenworth, State of Kansas, have invented certain new and useful Improvements in Wagon Brake-Locks; and I do hereby declare the following to be a full, clear, and exact description of the invention, such as will enable others skilled in the art to which it appertains to make and use the same.

The present invention relates to that class of devices which serve as a means of connection between a hand-lever located upon the body or bed of a wagon, and a brake located upon the running gear; and it aims to provide a connecting device of such a nature that the said two parts may be readily coupled and uncoupled without the use of any tool, such as a wrench or screw-driver, and that removable parts, such as screws and nuts may be dispensed with, thus avoiding the loss of parts and the waste of time in hunting them up when mislaid.

The invention will be readily understood from the following detailed description, and its preferred embodiment is illustrated in the accompanying drawings, in which like parts are designated by corresponding reference numerals in the several views.

Of the said drawings—Figure 1 is a side elevation of a wagon showing the application of the present invention to the other parts of a wagon brake. Fig. 2 is an enlarged side elevation of the invention proper. Fig. 3 is a longitudinal vertical section taken through Fig. 2.

Referring to the drawings, the numeral 5 represents the wagon-body, 6 one of the hind wheels, and 7 a brake-shoe carried by a lever 8, pivoted on the running gear of the wagon and arranged to engage said wheel.

With the construction, as above described, it is usual to secure the free end of the lever 8 to a rod by means of bolts or nuts, the rod extending to and being connected with the brake or operating lever 12, which is pivoted to the wagon-body. When it is desired to remove the wagon-body from the running gear, it is necessary to disconnect the rod from the lever 8 by removing the nuts or bolts with suitable tools, thus causing delay and requiring that tools be at hand, and also rendering liable the loss of said nuts or bolts after removal. This defect is overcome in the present instance by the provision of a connecting rod 9, adapted to be instantly connected to and disconnected from the lever 8 without the use of tools of any kind, the connection of the lever and rod being effected without the use of bolts or nuts. To this end, the rod 9 is provided with a removable head 10, having at one end an interiorly-threaded socket 11 in which the rod end is engaged. The head further includes a rearwardly-extending tongue 13, and a pair of laterally-projecting spaced parallel ears 14, which latter are disposed between the tongue and socket, above referred to, and are provided with registering openings for the reception of the pivot-bolt 15, upon which a lever 16 is mounted.

As shown in Fig. 3, the opposite ends of the lever 16 are disposed in different planes, the rear or lower end 17 extending directly over the tongue 13, and the front or upper end 18 extending between the ears 14.

The tongue 13 formed on the rod head is provided with a pair of laterally-projecting parallel pins 19, which extend therefrom in a plane parallel to those of the ears, the lower member or end of the lever 16 having a pair of elongated openings 20 formed therethrough, through which said pins extend when said lever is in its normal position. To maintain said lever in such position, its upper member or end 18 is normally elevated through the action of a coil-spring 21, carried by the head 10 and connected at opposite ends to a pair of inwardly-directed studs 22, formed on the head and on the under face of said lever end, the opposite end of the lever being thus depressed.

In connecting the lever 8 to the head 10, the head lever 16 is depressed against the action of the spring 21, so as to cause its lower end 17 to disengage itself from the pins 19, to one of which the lever 8 is then connected, its free end being provided for this purpose with an eye 23, it being understood that the height of the ears 14 and the disposition of the bolt 15, with respect thereto, is such that the lever end 17 may be moved sufficiently away from the pins to enable the lever 8 to be engaged therewith. With the removal of pressure from the end 18 of the lever 16, it will at once return to its normal position under the action of the spring 21, thus holding the lever 8 in place upon the pin and preventing its accidental disengagement therefrom.

It will thus be apparent that the lever 8, which directly actuates the brake-shoe, may be readily and quickly connected to and disconnected from the head of the tension-rod 9 by a single movement of the locking-lever 16, thus dispensing entirely with the use of bolts, nuts, or the like, and the necessary tools for operating the same.

It will likewise be apparent that the eye-end of the lever 8 may be engaged with either of the pins 19, so as to take up the slack or lost motion of the parts resulting from the wearing away of the brake-shoes.

It is to be understood, moreover, that the head 10 may be provided with more than two pins, if desired, and that other slight modifications and changes may be made within the scope of the appended claims, without departing from the spirit of the invention.

What is claimed, is—

1. A device of the class described comprising a rod having a head provided at its free end with a laterally projecting pin, and intermediate its ends with a pair of spaced ears extending laterally in the same direction as the pin; a lever pivoted between said ears and provided at its outer end with an opening through which said pin is adapted to extend when the lever is in one position; and positive means carried by said head for holding said lever in such position.

2. A device of the class described comprising a rod having a head provided with a rearwardly extending tongue having a laterally projecting pin; a pair of spaced ears extending laterally from said head in the same direction as said pin; a lever pivoted between said ears and provided at its outer end with an opening through which said pin is adapted to extend when the lever is in one position; and positive means carried by said head and bearing against the opposite end of said lever for holding the latter normally in such position.

3. A device of the class described comprising a rod having a head provided with a rearwardly extending tongue having a plurality of laterally-projecting parallel pins arranged in spaced relation to each other; a pair of spaced ears extending laterally from said head in the same direction as said pins; a lever pivoted between said ears and having its opposite ends disposed in different planes, one end of said lever extending directly over said tongue and being provided with a series of openings through which said pins are adapted to extend when the lever is in one position; and means carried by said head between said ears and adapted to bear against the opposite end of said lever, to hold the latter normally in such position.

4. The combination, in a wagon-brake, of a lever for actuating the brake-shoes, a tension-rod including a head having a rearwardly extending tongue provided with a series of parallel pins adapted for engaging said lever; a pair of spaced ears formed on said head and extending in the same direction as said pins; a lever pivoted between said ears and having its opposite ends disposed in different planes, one end of said lever extending directly over said tongue and having a series of openings through which said pins are adapted to project when the lever is in one position; a spring carried by said head between the ears and adapted to bear against the opposite end of the lever, to hold the latter in such position; and means for actuating the tension rod.

In testimony whereof, I affix my signature, in presence of two witnesses.

LAWRENCE ALLENBRAND.

Witnesses:
ERNST EBERTH,
HENRY GRIESSEL.